(12) United States Patent
Dorsel

(10) Patent No.: US 6,590,689 B1
(45) Date of Patent: *Jul. 8, 2003

(54) BACKGROUND REDUCTION APPARATUS AND METHOD FOR CONFOCAL FLUORESCENCE DETECTION SYSTEMS

(75) Inventor: Andreas N. Dorsel, Menlo Park, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/837,899

(22) Filed: Apr. 18, 2001

Related U.S. Application Data

(63) Continuation of application No. 09/359,631, filed on Jul. 22, 1999, now Pat. No. 6,222,664.

(51) Int. Cl.[7] .......................... G02B 26/02; G02B 21/00
(52) U.S. Cl. ...................... 359/227; 359/368; 359/396; 359/900; 359/601
(58) Field of Search ................................. 359/368–370, 359/385, 389, 227, 230, 231, 234, 236, 900, 885, 738, 396, 601, 613, 614; 250/201.2, 201.3, 201.4, 234–236, 216, 458.1

(56) References Cited

U.S. PATENT DOCUMENTS

| | | | | |
|---|---|---|---|---|
| 4,927,254 A | * | 5/1990 | Kino et al. | 359/368 |
| 5,153,428 A | * | 10/1992 | Ellis | 250/234 |
| 5,578,832 A | | 11/1996 | Trulson et al. | |
| 6,355,934 B1 | | 3/2002 | Osgood et al. | |

* cited by examiner

*Primary Examiner*—James Phan
(74) *Attorney, Agent, or Firm*—Gordon M. Stewart

(57) ABSTRACT

The system includes a confocal optical system to illuminate an object at an intended detection plane and to focus light from the object onto a pinhole. An opaque obstacle is disposed within the confocal optical system, the obstacle selected to suppress light originating outside the intended detection plane from passing through the pinhole. It is preferred that the obstacle size and location be selected to achieve a desired level of suppression. A design goal is a 100-fold reduction in background with a 10% or less loss of signal.

11 Claims, 6 Drawing Sheets

BACKGROUND REDUCTION APPARATUS AND METHOD FOR CONFOCAL FLUORESCENCE DETECTION SYSTEMS

CROSS REFERENCE TO RELATED APPLICATION

This application is a continuation of application Ser. No. 09/359,631 filed on Jul. 22, 1999, now U.S. Pat. No. 6,222,664.

BACKGROUND OF THE INVENTION

This invention relates to background reduction devices and methods and more particularly to background reduction in confocal fluorescence detection systems.

Biological molecules are often tagged with fluorescent marker molecules for identification in analytical instruments in which the biological molecules are supported on a surface. The fluorescent signals originating from the surface (e.g., a glass substrate with fluorescently labeled molecules bound to it) can be weak so that the detection limit is often set by background radiation that comes from sources that lie outside of an intended detection plane. The contribution of such sources to the detected signal can be reduced substantially by using a confocal system as described extensively in the literature. See, for example, *Handbook of Biological Confocal Microscopy*, James Pawley, Ed. As is well known, confocal systems as used in scanners and microscopes reduce signal from out-of-plane sources. However, confocal systems have a normalized detection probability that goes to zero only asymptotically as a function of increasing distance from the intended plane of detection.

As an example, in the case of scanning a chip in a cartridge such as the Affymetrix GeneChip, non-negligible signals can be caused by fluorescent deposits on the front of the glass of the chip as well as by the illuminating laser beam hitting the back wall of the liquid cell in the chip cartridge. Confocality alone may not provide sufficient attenuation of such unwanted signals. One approach to reducing out-of-plane signals (such as from a back wall) when the confocal depth discrimination is insufficient is off-axis detection as used in a Hewlett-Packard G2500A system. However, off-axis detection is difficult to modify for large numerical aperture, i.e., high light collection efficiency. The present invention aims at specifically reducing unwanted background contributions for which confocality alone may not provide adequate suppression.

SUMMARY OF THE INVENTION

In one aspect, the background reduction system according to the invention is a confocal optical system for illuminating an object at an intended detection plane and to focus light emanating from the object onto a pinhole. An opaque obstacle is disposed within the confocal optical system, the obstacle selected to suppress light originating outside the intended detection plane from passing through the pinhole. The obstacle size and location are selected to achieve a desired level of suppression. The obstacle may be an opaque bulk obstacle or an opaque thin film supported, for example, on a transparent substrate. A bulk obstacle may also be supported by a beam or wire.

In another aspect, the invention is a method for determining obstacle size in a confocal optical system including a pinhole for light suppression outside of an object plane including calculating the diameter of a pinhole image in the object plane. The diameter of the percentage of encircled energy of an illuminating light source to be blocked is calculated in a plane of origin of the radiation to be blocked. Rays are traced back through edges of the pinhole image circle and the circle of encircled energy to a plane in which the obstacle is to be placed. The smallest circle that encircles loci of the rays in the obstacle plane is determined and the diameter of the smallest circle serves as the diameter of the obstacle. The center of this smallest circle serves as the center of the obstacle.

A confocal detection system is thus improved by placing an obstacle between the object plane and the confocal system pinhole. The size of the obstacle determines the degree of suppression of signals outside the intended detection plane. The bigger the obstacle, the higher the suppression will generally be. However, as the obstacle becomes bigger, it also reduces the transmission of signals from the intended detection plane. There is thus a trade-off to be made between background suppression and signal loss. The diameter of the obstacle may be increased to allow for alignment tolerances.

DESCRIPTION OF THE PREFERRED EMBODIMENT

Figure 1A:
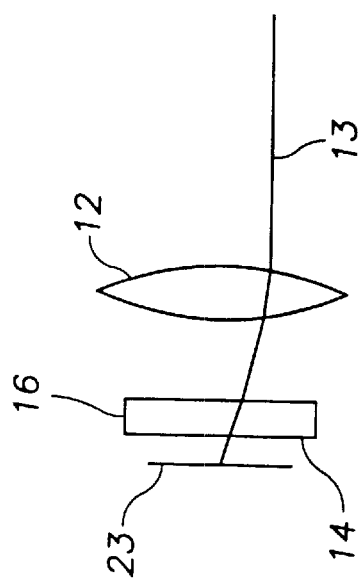
FIG. 1a is a cross-sectional view of a confocal optical system.
Figure 1B:
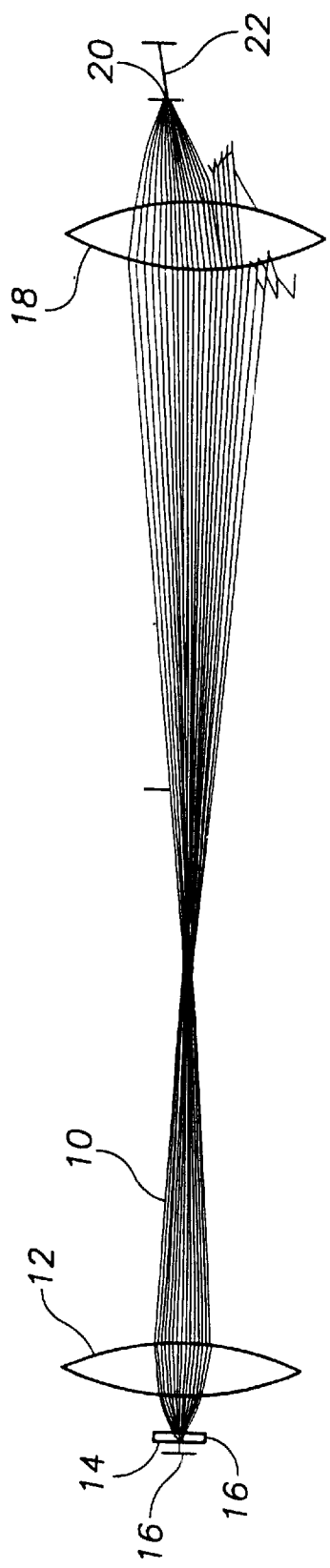
FIG. 1b is a cross-sectional view of an optical system for imaging scattered light.

The theory on which the present invention is based will now be discussed in conjunction with FIGS. 1a, 1b and 2. FIG. 1a shows the general case of illumination in a confocal system. An objective lens 12 focuses incoming light rays 13 on a far side 14 of a glass slide 16 forming a flow cell together with a back wall 23. The array to be scanned is assumed to be on the surface 14 and the background is assumed to be originating from the back wall 23. In other situations the background may be coming from the near side surface of the glass slide 16 and near side and far side surfaces may be swapped in case no flow cell is needed. FIG. 1b shows the imaging of scattered (e.g. fluorescent) light originating from the back wall 23. A portion of the light is collected by the objective lens 12. Some of these collected rays are blocked by a lens system 18 focusing them into a pinhole 20 plane. Others are blocked by the pinhole 20 so that in the example shown only one ray 22 is passed into the pinhole and allowed to reach the detector. This is the (finite) depth discrimination of a confocal system.

Figure 2:
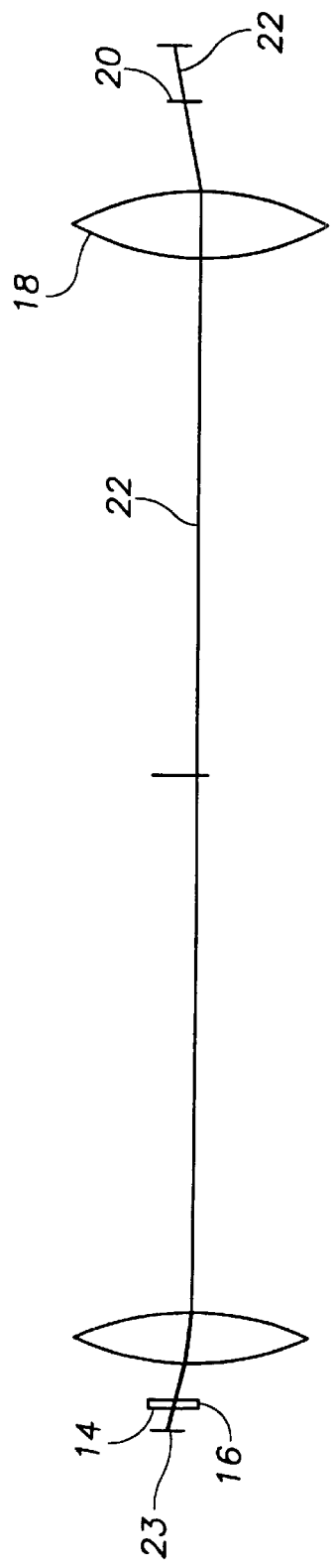
FIG. 2 is a cross-sectional view of an optical system showing a single ray.

FIG. 2 shows only the ray(s) that are not suppressed by the pinhole, thus illustrating that these will typically be (almost) parallel and for the case discussed so far coincident with the incoming laser beam. The goal of the invention is to substantially improve upon the depth discrimination of such a classical confocal system.

Figure 3:
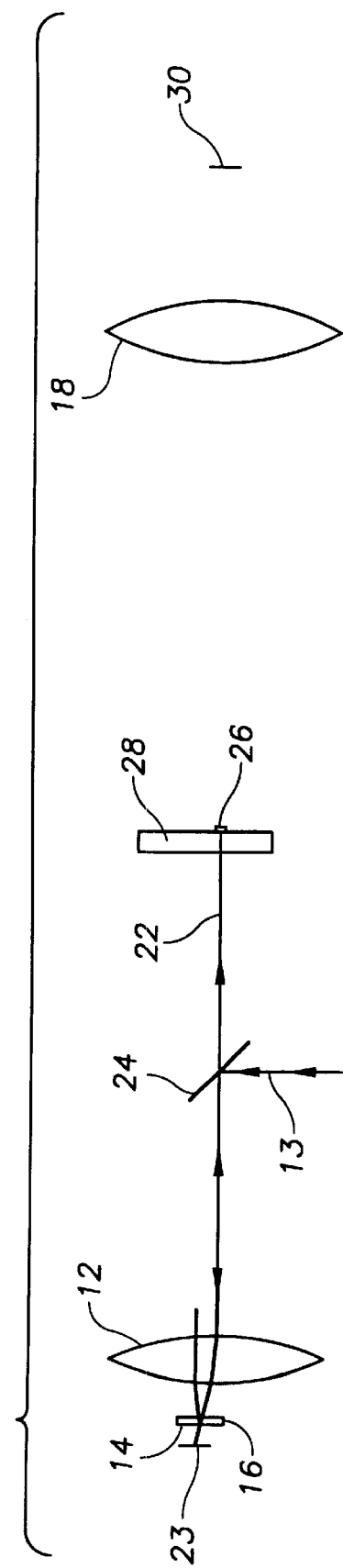
FIG. 3 is a cross-sectional view of one embodiment of the invention.

According to the invention, an unwanted ray such as the ray 22 can be suppressed by using an obstacle as will now be discussed in conjunction with FIG. 3. The light beam or ray 13 from a source such as a laser (not shown) is directed onto a beam splitter 24 which may be a dichroic mirror. The ray 13 passes through the optical system 12 and hits the back wall. Fluorescent light that is not rejected by the confocal system alone returns through the beam splitter 24 and is blocked by an obstacle 26. The obstacle 26 may be a thin film opaque to the radiation to be suppressed mounted on a transparent substrate 28. It will be appreciated by those skilled in the art that instead of an opaque thin film, the obstacle may be a small opaque bulk obstacle that is supported, for example, by a thin beam, wires or other means. As can be seen in FIG. 3, the ray 22 is blocked by the obstacle 26 and hence does not reach a detector 30.

The size of the obstacle 26 determines the degree of suppression of signals from objects outside an intended detection plane. The bigger the obstacle 26 the higher the suppression will generally be. However, as the obstacle 26 becomes bigger, it also reduces the transmission of signals from the intended detection plane. In general this relationship means there is a trade-off to be made between background suppression and signal loss. It will be obvious to someone skilled in the art, that this technique is only applicable in systems for which the illuminating beam does not fill the pupil of the objective lens; otherwise the obstacle would block the entire pupil. Scanning illumination often fills only a small fraction of the objective pupil. In a typical case, the goal is to improve the depth discrimination of a given system by more than an order of magnitude over that of a conventional confocal system for background originating 1 mm outside the confocal plane while causing a signal loss of 10% or less. A design goal is to achieve approximately a 100-fold reduction at 10% or less of signal loss which is attainable with a carefully aligned/designed system.

An approximate value for a suitable diameter for the obstacle 26 can be selected in the following way (other ways will be obvious to those skilled in the art). First, the diameter of the image of the pinhole in the object plane is calculated. The diameter of the encircled energy of the illumination light source (laser) to be blocked in the plane of origin of the radiation to be blocked (e.g., the back wall 14) is then calculated. Rays are traced back through the edges of the two circles to the plane in which the obstacle is to be placed. The obstacle diameter is the diameter of the smallest circle that encircles the loci of all of the rays in the obstacle plane. The obstacle diameter can be increased to accommodate alignment tolerances as necessary. The center of the circle can serve as the center of the obstacle. The obstacle diameter can be fine tuned by a more detailed theoretical analysis or by empirical study. The above-described technique can be extended for non-circular configurations of the pinhole, laser beam and/or the obstacle. It should be noted that a straightforward way of determining the obstacle center is to trace the illuminating principal ray back towards the confocal pinhole and center the obstacle on that ray.

The technique of the invention can be extended to moving beam systems either by moving the obstacle in synchronism with the beam or by placing the obstacle in a plane where the (back traced) beam does not move, or in some cases, even by increasing the obstacle's diameter to accommodate beam movements. In a fluorescent scanner using a dichroic mirror to separate illumination and fluorescent light, the obstacle can be placed between the dichroic mirror and the object plane if it is transparent to the laser beam and opaque to the radiation to be blocked, i.e., if it is dichroic in itself.

Figure 4:
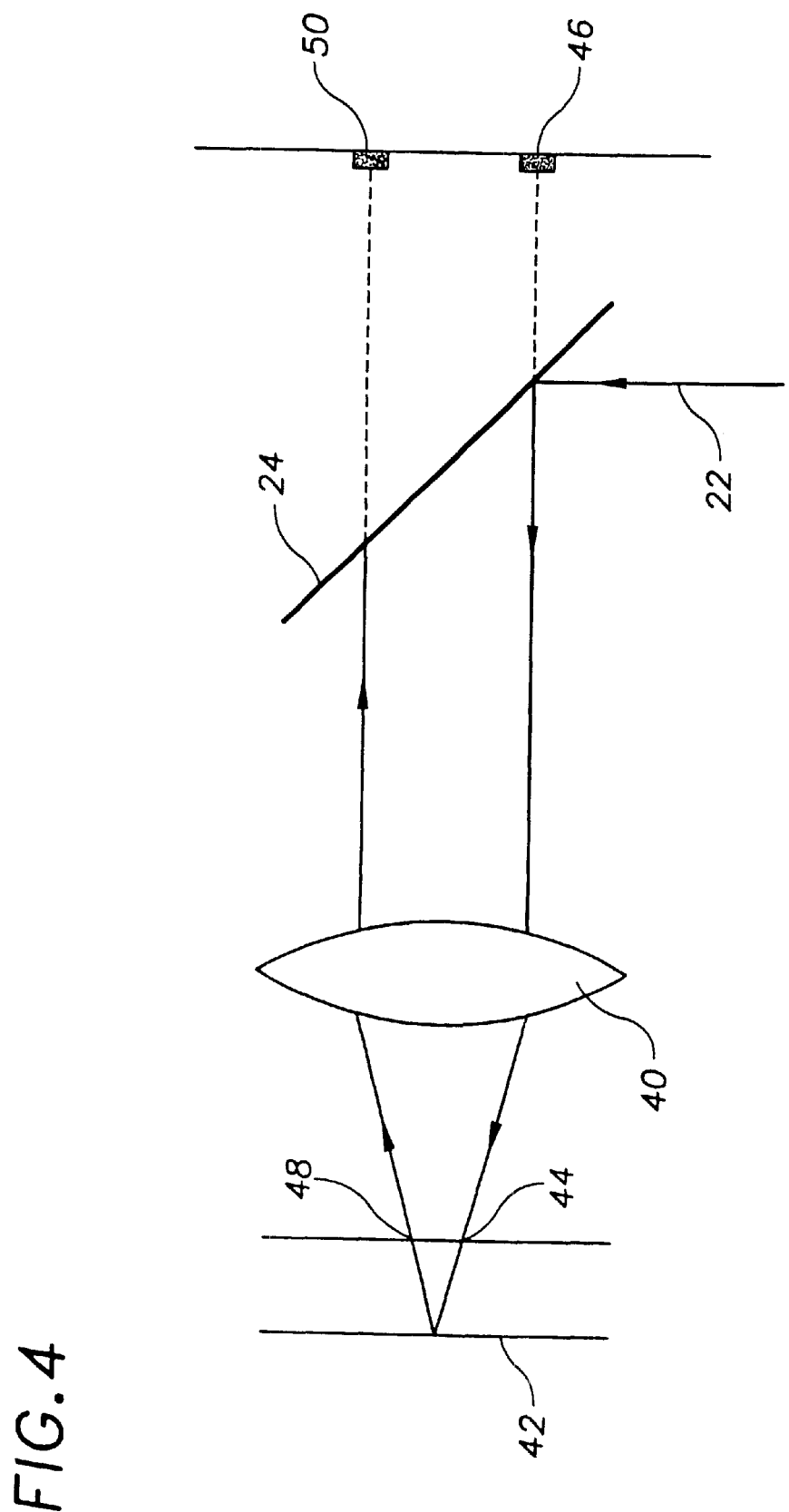
FIG. 4 is a cross-sectional view of another embodiment of the invention.

Another embodiment of the invention is shown in FIG. 4. For some applications, e.g., dry chips, blocking with a single obstacle may not be sufficient. As shown in FIG. 4, laser light 22 reflected by the beam splitter 24 is focused by an objective lens 40 into a confocal plane 42. Background light from outside the confocal plane 42, e.g., from a location 44 that goes directly through the objective 40 towards a pinhole is blocked by an obstacle 46. However, background light from the location 44 that is reflected (Fresnel reflection) at the substrate interface 42 (e.g., glass-air) can still reach the pinhole via Fresnel reflection thus setting an upper limit on the suppression achievable with a single obstacle 46. Similarly, the illuminating beam 22 is reflected at 42 and can excite background at location 48. Both such sources of limiting background can be blocked by a second obstacle 50.

It should be noted that the obstacle can be located on the optical axis rather than off-axis as shown in FIG. 3: When two obstacles are used, as shown in FIG. 4, on-axis illumination has the advantage of the obstacles being coincident thus not doubling the reduction in collection pupil size.

For a two spot scanner as disclosed and claimed in copending, commonly assigned U.S. application Ser. No. 09/238,482 filed Jan. 28, 1999 it is preferable to extend the beams going from the dichroic beam splitter toward the scan lens back through the dichroic if necessary and to place the obstacle at the intersection of these two beams so that it can act on both beams individually and on any cross talk between them. In this case, the beam arrangement has to be such that the two beams (or their extensions) intersect at some point. If the obstacle is placed in a different plane, this situation can be made up for by either using two obstacles (one for each beam) or a bigger one than otherwise required or one of different shape (oval or racetrack shape).

Figure 5:
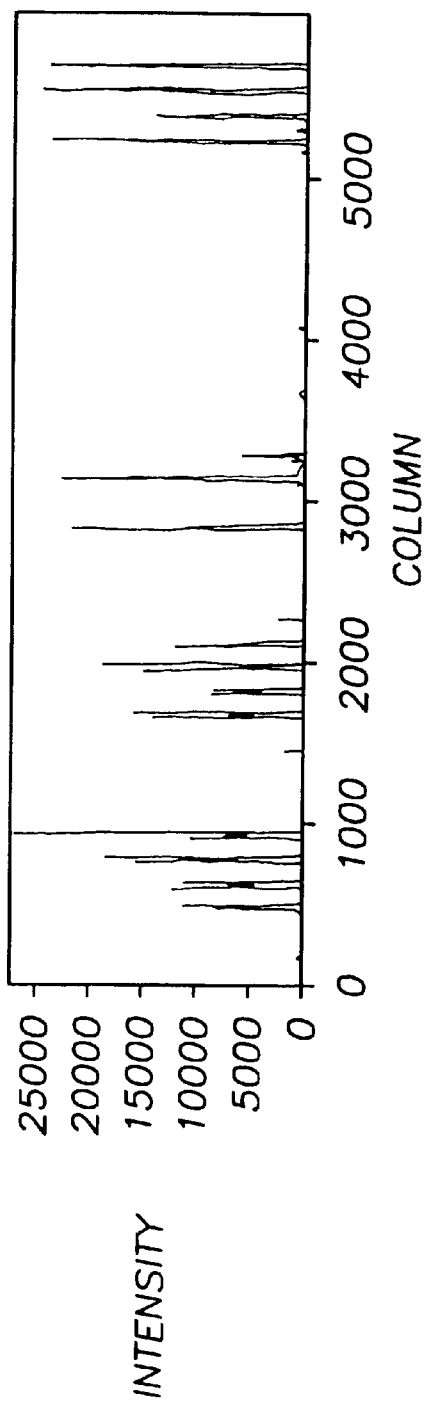
FIG. 5 is a plot of intensity versus chip column.
Figure 6:
FIG. 6 is an image obtained when scanning confocally with an obstacle in place.
Figure 7:
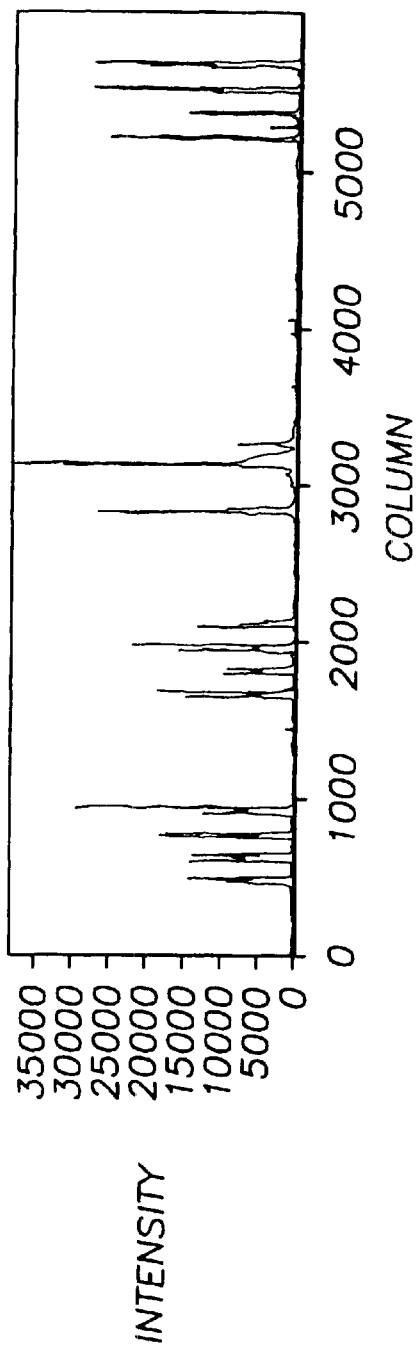
FIG. 7 is a plot of intensity versus column in the absence of an obstacle.
Figure 8:
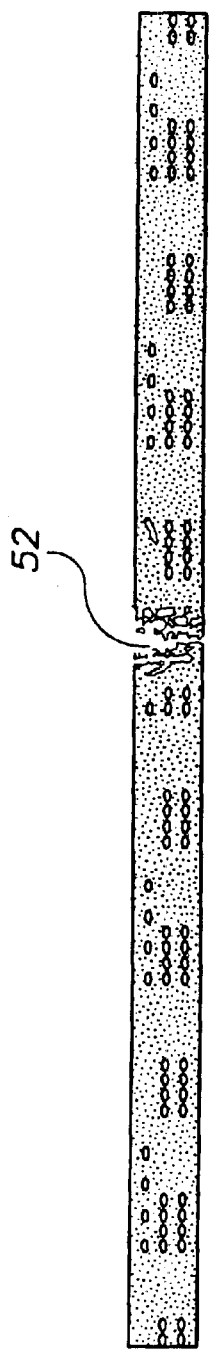
FIG. 8 is an image when scanning confocally in the absence of an obstacle.
Figure 9:
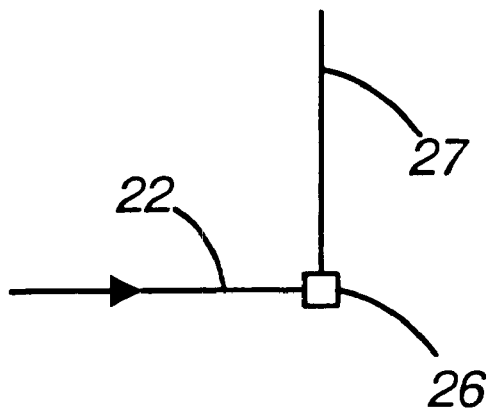
FIG. 9 is a cross-section of a portion of one embodiment of the present invention.
Figure 10:
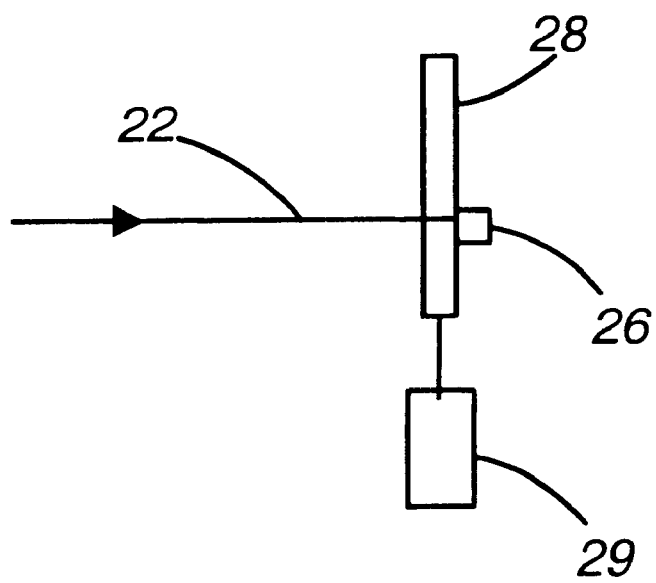
FIG. 10 is a cross-section of a portion of another embodiment of the present invention.

FIGS. 5–8 show results of an experiment which resulted in a background reduction of approximately 30-fold and a signal loss of about 10–20%. Obstacle size and placement was not optimized in this experiment. In the experiment, a fluorescent marker was used to mark the opposite side of a slide having a fluorescent array on the side that is in the confocal plane. FIGS. 5 and 6 show a plot and image, respectively, as obtained when scanning confocally with an obstacle in place, FIGS. 7 and 8 show a plot and image in the absence of an obstacle. Note that a streak 52 shown in the image of FIG. 8 has been visually suppressed as shown in the corresponding location in FIG. 6. Note also that the profiles shown in FIGS. 5 and 7 show that the right hand shoulder of the feature peak near column 3,000 in FIG. 7 (no obstacle) is very efficiently suppressed as shown in FIG. 5 (obstacle in place). The moderate reduction in signal height in FIG. 5 caused by the obstacle blocking part of the collection pupil is also visible.

While the background reduction methodology of the invention was originally intended primarily to get rid of light from the back wall of a chip in a cartridge such as an Affymetrix GeneChip, the invention will also help to suppress light from other undesirable sources of background outside the intended plane of detection in a confocal system. Undesirable sources of background may include (but are not limited to) any combination or selection from the following: background from liquid in the cartridge, the bulk of the glass chip, the front surface of a glass chip, the objective lens, or other (optical) components of the scanner.

It is to be noted that while a suitable application of the technology disclosed herein is for fluorescence scanning, the technology may also have application in, for example, elastic scattering. The invention results in drastically reduced background radiation from sources outside an intended detection plane in confocal detection systems while incurring only a very moderate loss of useful radiation coming from the intended detection plane.

It is recognized that modifications and variations of the invention disclosed herein will occur to those skilled in the art and it is intended that all such modifications and variations be included within the scope of the appended claims.

What is claimed is:

1. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    and including more than one obstacle between the detection plane and the pinhole for background suppression.

2. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    wherein the obstacle size and location are selected to achieve a 100-fold reduction in background over the optical system with a loss of signal of 10% or less for background sources 1 mm outside the intended detection plane.

3. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    wherein the obstacle is on a transparent substrate.

4. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    wherein the obstacle is supported on a filter substrate.

5. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    wherein the object is on a side of a slide and the light suppressed is from the other side of the slide or a back wall with which the slide forms a cell.

6. A method according to claim 5 further including moving the obstacle in synchronism with a moving beam.

7. A method according to claim 5 wherein the light suppressed is from the back wall with which the object forms the cell.

8. A method according to claim 5 wherein the object is on a far side of the slide and the light suppressed is from a near side of the slide.

9. A method according to claim 5 wherein the object is on a near side of the slide and the light suppressed is from a far side of the slide.

10. A method according to claim 5 wherein the object is an array which is scanned.

11. A method of reducing background in an optical system, comprising:
    using an optical system to illuminate an object at an intended detection plane and focus light from the object onto a pinhole, and additionally
    using an obstacle disposed within the optical system between the detection plane and the pinhole, to suppress light originating outside the intended detection plane from passing through the pinhole;
    wherein the obstacle size and location are selected to improve depth discrimination by more than an order of magnitude over the optical system with a loss of signal of 10% or less for background sources 1 mm outside the intended detection plane.

* * * * *